Figure 1:
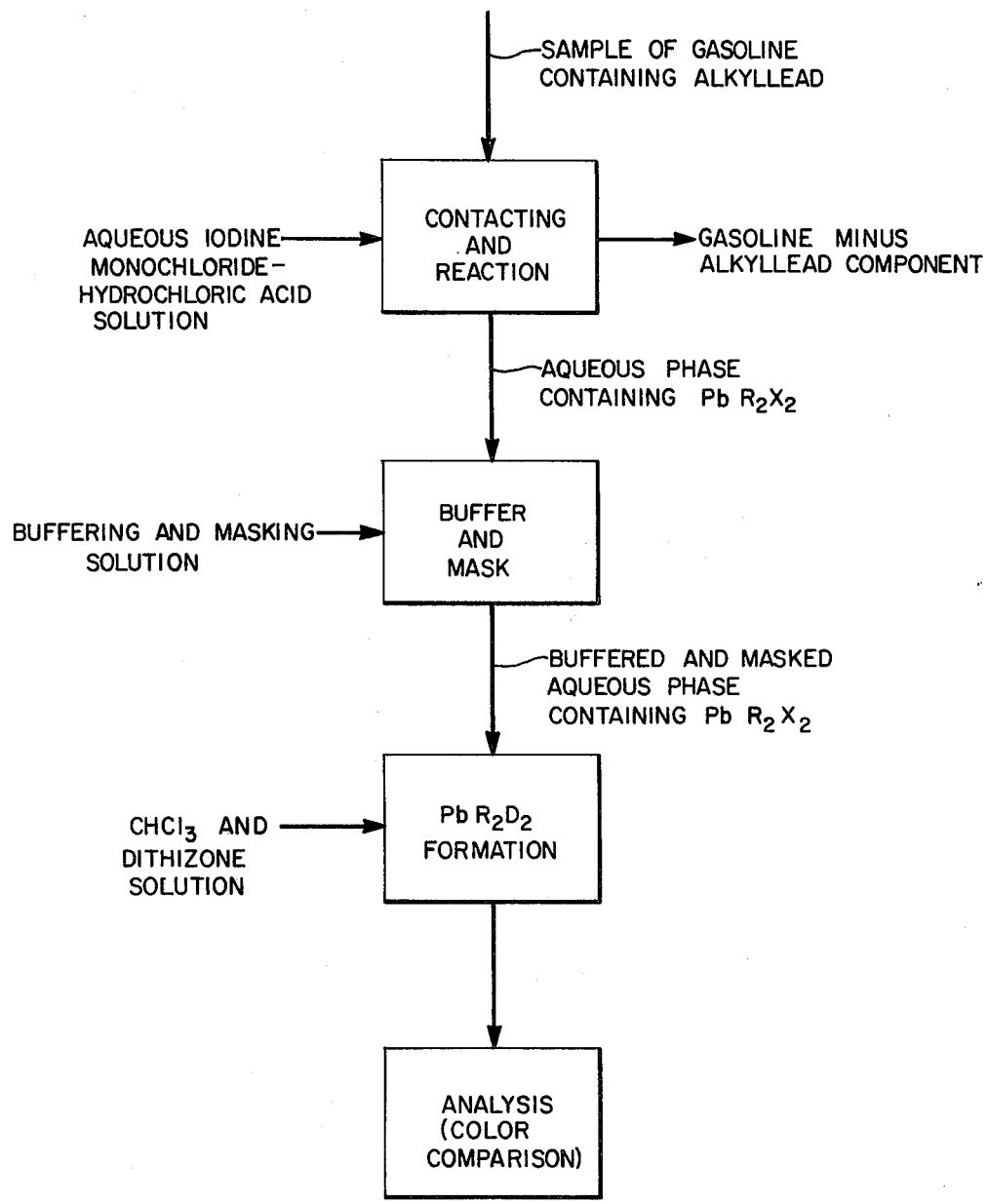

United States Patent [19]

Snyder

[11] 3,912,454

[45] Oct. 14, 1975

[54] DETERMINATION OF ANTIKNOCK COMPOUNDS IN GASOLINE

[75] Inventor: Louis J. Snyder, Baton Rouge, La.

[73] Assignee: Ethyl Corporation, Richmond, Va.

[22] Filed: June 24, 1974

[21] Appl. No.: 481,967

[52] U.S. Cl. ........ 23/230 R; 23/230 HC; 23/230 M; 23/232 R
[51] Int. Cl.$^2$ .................. G01N 31/22; G01N 33/22
[58] Field of Search ......... 23/230 R, 232 R, 230 M, 23/230 HC

[56] References Cited
OTHER PUBLICATIONS

Henderson et al., Anal. Chem. Vol. 33, pp. 1172–1175, Aug. 1961.
Snyder et al., Anal. Chem. Vol. 33, pp. 1175–1180, Aug. 1961.
Schulek et al., Talanta, Vol. 1, pp. 147–152, 1958.
Parker et al., Anal. Chem. Vol. 33, pp. 1170–1171, Aug. 1961.

*Primary Examiner*—Morris O. Wolk
*Assistant Examiner*—Barry I. Hollander
*Attorney, Agent, or Firm*—Donald L. Johnson; John F. Sieberth; Edgar E. Spielman, Jr.

[57] ABSTRACT

A process for determining concentrations of lead as alkylleads in fluids which includes: contacting the fluid with iodine monochloride, which is in an aqueous hydrochloric acid solution, to yield, in the aqueous solution, lead dialkyl dihalide, in which the halogen constituent is either chlorine, iodine or a mixture thereof; treating at least part of the resultant aqueous solution with a buffering and masking solution which contains, (1) alkali metal sulfite, (2) dialkali metal ethylenediaminetetraacetate, (3) an alkylenepolyamine, alkali metal cyanide or a mixture thereof, (4) a base such as ammonium hydroxide or alkali metal hydroxide, and (5) citrates, acetates, or tartrates of ammonium or alkali metal or mixtures thereof; contacting the treated aqueous solution with a solution of an inert colorless dithizone solvent, which is immiscible in water, and dithizone to yield lead dialkyl dithizonate in the solvent phase, and determining, by measuring the color intensity or by comparing the color of the solvent phase with standardized colors, the concentration of lead as alkyllead present in the fluid.

13 Claims, 2 Drawing Figures

FIG. I.

STANDARDIZATION CURVE

DETERMINATION OF ANTIKNOCK COMPOUNDS IN GASOLINE

BACKGROUND OF THE INVENTION

The determination of the concentration of lead as alkyllead compounds in fluids is a matter of considerable practical importance. For example, in the future, methods determinative of such lead concentrations in gasoline will be of utmost importance in view of government guidelines requiring the manufacture and marketing of so-called "unleaded" gasoline. Another example where such methods will be useful is in the pollution control area where the alkyllead concentration in aqueous plant effluent and in the atmosphere are to be monitored. Analytical methods for such determinations should have the capability of being utilized in the field by non-technical personnel and still have a high degree of sensitivity.

Various analytical methods have been reported for measuring lead concentrations as alkyllead in fluids, e.g., chemical methods, colorimetric methods, polarographic methods, X-ray methods and flame photometry methods. Of these methods, the colorimetric methods have a special usefulness in that they are capable of determining alkyllead concentrations in fluids in micro quantities with the use of only a small sample. Exemplary of colorimetric methods are the methods described by S. R. Henderson and L. J. Snyder in *Analytical Chemistry*, 33, pages 1172 et seq (1961) and in U.S. Pat. No. 3,071,446.

The former method is utilized for determining lead as tetraalkyllead in gases. This procedure, while quite useful, is disadvantageous as it requires a special chamber through which the air must be passed and is not adaptable for determination of alkyllead concentrations in liquid media.

The other method mentioned above gives a mode for determining, in liquid, the concentration of tetraalkyllead as well as triaalkyllead, dialkyllead and other lead ions. This procedure, however, to determine tetraalkyllead compounds, requires a double run of the analyses with the concentration of tetraalkyllead being computed by the difference between the results of the two runs. As can be appreciated, this method is not readily adaptable to field use especially when the lead contents of liquids such as gasoline are to be determined.

Therefore it is an object of this invention to provide a method for the determination of the concentration of lead as alkyllead in liquids and/or gases which is capable of being run by non-technical personnel and which is highly sensitive and accurate.

THE INVENTION

This invention relates to a process for the determination of the concentration of lead as alkyllead in fluids which comprises contacting the fluid with iodine monochloride, which is in an aqueous hydrochloric acid solution, to yield, in the aqueous solution, lead dialkyl dihalide, in which the halogen constituent is chlorine, iodine or a mixture thereof; treating at least part of the resultant aqueous solution with a buffering and masking solution which contains (1) alkali metal sulfite, (2) citrates, acetates, or tartrates of ammonium or alkali metal or mixtures thereof, (3) an alkylenepolyamine, alkali metal cyanide or a mixture thereof, (4) dialkali metal ethylenediaminetetraacetate, and (5) a base such as ammonium hydroxide or alkali metal hydroxide; contacting the treated aqueous solution with a solution of an inert colorless dithizone solvent which is immiscible in water and dithizone to yield lead dialkyl dithizonate in the solvent phase; and determining, by measuring the color intensity or by comparing the color of the solvent phase with standardized colors, the concentration of lead as alkyllead present in the fluid.

The process of this invention features wide versatility and simplicity of operation. This process may be utilized to determine concentrations of lead as alkyllead in both liquids and in gases. Another feature of this process is that it may be utilized for determination of these lead concentrations in liquids which are either miscible, e.g. waste water effluents, or immiscible, e.g. gasoline, with respect to the iodine monochloride-hydrochloric acid aqueous solution. Still another feature of this invention is that the various reagents and procedures are readily adaptable to field kit form which may be utilized by non-technical people.

For a further description of the process of this invention reference is made to FIG. 1 which is a schematic diagram illustrating an embodiment of this invention as it is utilized to determine alkyllead concentrations in gasoline.

Referring now to FIG. 1, it can be seen that a sample of gasoline is fed to a container containing an aqueous iodine monochloride-hydrochloric acid solution. The iodine monochloride, upon achieving intimate contact with the gasoline, will react with alkyllead present in the gasoline to yield lead dialkyl dihalide ($PbR_2X_2$). This dihalide will be a dichloride, diiodide or an iodochloride. The minimum amount of iodine monochloride needed is that amount which is sufficient to react with all of the alkyllead in the gasoline and with any other reaction-competing compounds such as olefins, highly branched chained alkanes and sulfur compounds, which are likewise in the gasoline. Amounts in excess of the minimum amount are suitable and are even preferred. Generally, highly suitable aqueous iodine monochloride hydrochloric acid solutions are those which have iodine monochloride concentrations ranging from about 0.05 to about 1.0 and hydrochloric acid molar concentrations ranging from about 0.25 to about 1.0. For testing gasoline containing less than 0.10 grams alkyllead/gallon, a preferred iodine monochloride molar concentration ranges from about 0.075 to about 0.2 and a preferred hydrochloric acid molar concentration ranges from about 0.4 to about 0.7.

The volumetric ratio of gasoline to the aqueous iodine monochloride-hydrochloric acid solution is not especially critical. Of course, extreme ratios should be avoided from a practical standpoint. Exemplary of suitable volumetric ratios of gasoline to aqueous iodine monochloride-hydrochloric acid solution range from about 10:1 to about 1:20. A preferred and highly suitable ratio is one within the range of 1:2 to about 1:6.

Achieving intimate contact between the gasoline and the aqueous iodine monochloride-hydrochloric acid solution may be achieved by vigorously shaking the mixture. After a short period of shaking, e.g. 1 to 2 minutes, the solution is allowed to set to a gasoline phase and an aqueous phase. To facilitate the subsequent treatment steps of the process of this invention, the aqueous phase should be completely separated from the gasoline phase, or a measured amount of aqueous phase should be taken. The latter procedure is preferred as affecting complete separation between the gasoline phase and the aqueous phase is time consuming and involved. The taking of a measured sample can be easily achieved by the use of a pipette or other similar laboratory equipment.

After the above separation, or taking of a measured amount, the aqueous phase (which contains the lead dialkyl dihalide) is contacted with an aqueous buffering and masking solution. This aqueous solution contains (1) alkali metal sulfite, (2) citrates, acetates, or tartrates or ammonium or alkali metal or mixtures thereof, (3) an alkylenepolyamine, alkali metal cyanide or mixtures thereof, (4) dialkali metal ethylenediaminetetraacetate, and (5) a base such as hydroxides of ammonium, alkali metal or any mixtures of such compounds.

The alkali metal sulfite, preferably sodium or potassium sulfite, is utilized to convert, by reduction, any excess iodine monochloride which may still be present in the aqueous phase to $I^-$ and $Cl^-$ ions. Such a conversion is necessary so that the iodine monochloride will not oxidize dithizone which is to be subsequently added, as hereinafter described. The amount of alkali metal sulfite utilized can conveniently be the amount which is stoichiometric with the amount of iodine monochloride originally used. Lesser amounts can, of course, be used as long as no iodine monochloride is present after the sulfite has contacted the lead dialkyl dihalide-containing aqueous solution. Suitable amounts of sulfite, for example when testing commercial gasolines, are those ranging from about 0.25 to about 0.80 milligrams per milliliter of buffering and masking solution.

Metal ions such as calcium, barium, iron, etc., which may be present in the aqueous phase and which may precipitate as sulfates or hydroxides are instead complexed by the citrates, acetates or tartrates of ammonium or alkali metal. By preventing the formation of these precipitates interference with subsequent colorimetric analyses will be avoided. The citrates, acetates or tartrates may be provided singularly or in combination. Furthermore, they may be either dibasic or tribasic. A preferred compound from this group is dibasic ammonium citrate. Quantitatively, for most commercial gasolines, the amount of the citrates, acetates or tartrates which will give satisfactory masking of interference from the metal ions ranges from about 0.0004 to about 0.4 grams per milliliter of buffering and masking solution. Preferred amounts are those ranging from about 0.004 to about 0.04 grams per milliliter.

The presence of metal ions which do not form precipitates in the process of this invention must also be masked as many of these ions will form metal complexes with dithizone. These complexes have a color which results in distortion of the color from the desired dialkyl lead dithizonate. Exemplary of such ions are ions of silver, gold, bismuth, cadmium, cobalt, copper, iron, mercury, manganese, nickel, platinum, tellurium, selenium, tin, thallium, vanadium and zinc. It has been found that the formation of the dithizone complex with these ions can be inhibited by the inclusion of an alkylenepolyamine in the buffering and masking solution. The alkylenepolyamine will form a complex with the ions thus preventing the formation of the unwanted dithizone complex. Substitutes for the alkylenepolyamine are alkali metal cyanides, preferably sodium cyanide, potassium cyanide or mixtures thereof. These latter compounds, like the alkylenepolyamine, complex the soluble metal ions and therefore prevent formation of the undesirable colorful complexes. When utilizing a preferred alkylenepolyamine, tetraethylenepentamine, in analysis of most commercial gasolines, amounts ranging from about 0.04 to about 0.4 milligrams per milliliter of buffering and masking solution are suitable. Suitable amounts of alkali metal cyanide range from about 0.003 to about 0.012 grams per milliliter of buffering and masking solution.

Since the process of this invention is utilized primarily to measure concentrations of lead as alkyllead in fluids, the presence of uncomplexed inorganic lead degrades the efficiency and accuracy of the procedure as the dithizone will complex with the soluble inorganic lead ions to yield a color which interferes with the final desired color obtained. It has been found that if dialkali metal ethylenediaminetetraacetate is included in the buffering and masking solution this interference will be prevented. The amount of dialkali metal ethylenediaminetetraacetate which is suitable, when analyzing commercial gasolines in the field where inorganic lead contamination may be fairly high from sources other than the samples of interest, ranges from about 1 to about 10 milligrams per milliliter of buffering and masking solution. Preferential amounts range from about 4 to about 7 milligrams per milliliter of buffering and masking solution. Preferred dialkali metal ethylenediaminetetraacetates are disodium ethylenediaminetetraacetate, dipotassium ethylenediaminetetraacetate and mixtures thereof.

The base in the buffering and masking solution maintains the aqueous phase, to which the solution is added, at a pH which is basic. This maintenance is important when the dithizone and dithizone solvent are contacted with the buffered and masked aqueous phase, as hereinafter described, as any excess dithizone is kept in this treated aqueous phase while allowing the product of the reaction between the dithizone and the lead dialkyl dihalide i.e., lead dialkyl dithizonate ($PbR_2D_2$) to be substantially in the solvent phase. If the unreacted dithizone were allowed, due to the pH being too low, to migrate to the solvent phase it would result in a masking of color as the dithizone has a definite greenish tint. Preferred bases are the hydroxides of ammonium and alkali metal. Of these preferred bases ammonium hydroxide is most preferred. The amount of base used in the buffering and masking solution is that amount necessary to give this solution sufficient basicity to provide the aqueous phase with the above-mentioned minimum pH. Generally speaking, the resultant pH of the aqueous phase to which the buffering and masking solution is added should be within the range of from about 10 to about 11.5. A preferred pH is about 10.5. The amount of base in the buffering and masking solution, and thus the basicity of such solution, necessary to achieve the resultant pH in the aqueous phase is dependent upon the original pH of the aqueous phase and upon the volumetric ratio of the buffering and masking solution to the aqueous phase. Determination of the amount of base to be used in the buffering and masking solution is easily determined by those skilled in the art by the use of trial and error and with consideration of the above-mentioned dependencies.

The quantity of buffering and masking solution utilized per milliliter of aqueous phase will be that amount which is necesssary to achieve the above described masking and pH obtainment. Within the quantitative ranges mentioned for the various ingredients in the buffering and masking solution it has been found that, for analyzing commercial gasoline, a volumetric ratio of buffering and masking solution to aqueous phase of from about 0.5 to about 7:1 is desirable. For these gasoline applications preferred ratios are those within the range of from about 1:1 to about 6:1.

After the aqueous phase has been treated with the buffering and masking solution it is then contacted with dithizone in an inert colorless dithizone solvent which is immiscible in water. Exemplary of colorless dithizone solvents are chloroform, 1,1,1-trichloroethane, 1,1-dichloroethane, carbontetrachloride, aromatics such as toluene, benzene, ethers such as diethyl ether, ketones such as methylisobutyl ketone, etc. For best color obtainment the amount of dithizone used should be that amount which is at least 75 percent in excess of the stoichiometric amount needed to convert the lead dialkyl dihalide to lead dialkyl dithizonate. Amounts which are about 100 percent in excess of stoichiometric are preferred.

After the treated aqueous phase has been contacted with the dissolved dithizone, the two are agitated vigorously for ten or more seconds and then allowed to separate into a solvent phase and an aqueous phase. The solvent phase will contain the formed lead dialkyl dithizonate ($PbR_2D_2$). The treated aqueous phase contains the buffering and masking solution, excess dithizone, and all of the resultant complexes and products formed therein.

The last step in the procedure is the determination of the concentration of lead as alkyllead by comparison of the color of the solvent phase, with reference color standards. These standards can be obtained by the use of solutions of lead dialkyl dithizonate in the same organic solvent, calibrated colored glass discs, or by a color comparator device such as the Model T-600 Colorimeter available from Instratech, Inc. of California. If the color comparator is used, samples of gasoline containing known amounts of alkyllead are subjected to the identical analysis of the unknown sample to determine their light transmittance for the known amount of alkyllead. These transmittance values are then plotted vs. grams lead/gallon of gasoline on semilog paper to obtain a straight line curve. From this curve determination of grams lead/gallon gasoline can be easily found for samples containing unknown quantities of alkyllead in gasoline samples which are tested in the identical manner as the known samples.

The lead measured as alkyllead in most commercial gasolines is present as tetraethyllead, tetramethyllead, dimethyllead, trimethylethyllead and triethylmethyllead. Other alkylleads can also be measured by the process of this invention; for example, tetraphenyllead, tetrabutyllead, tetravinyllead, tetraisobutyllead, etc. The process of this invention also measures lead as alkyllead ions which are present such as diethylmethyllead, triethyllead, dimethyllead, and the like.

Contacting of the various reagents and solutions described above is easily achieved by merely adding one to the other. The conditions under which the analytical procedure of this invention may be run are atmospheric conditions. In extremelly cold climates care may have to be exercised to prevent freezing of the analytical reagents.

As can well be appreciated from the above description, the process of this invention can be used to determine lead as alkyllead concentrations in fluids other than gasoline.

When measuring these lead concentrations in systems miscible with the aqueous iodine monochloride-hydrochloric acid solution, e.g. aqueous systems, the procedure used is identical to the above-described for gasoline except that there is no need to separate phases prior to the addition of the buffering and masking solution. As in the case for gasoline, liquid systems immiscible with the iodine monochloride-hydrochloric acid aqueous solution are preferably separated from the solutions after contact has been achieved therebetween.

The measurement of the concentration of lead as alkyllead in gases is also achieved by the above-detailed procedure for measurement of lead/gallon of gasoline except that the gas is bubbled through the aqueous iodine monochloride-hydrochloric acid solution at a rate sufficiently slow to insure reaction of the alkyllead in the gas with the iodine monochloride. Of course, no separation of phases at this point is necessary.

Pumps or other devices for aspirating the gas sample through the aqueous iodine monochloride-hydrochloric acid solution may be used. Such a pump may be hand-operated, reciprocating pump whereby a standard number of reciprocations delivers a known volume gas sample. Alternatively a positive-displacement, power-operated, rotating pump can be employed.

When the process of this invention is used to analyze lead as alkyllead in fluids other than gasoline, the various amounts of reactants needed will, of course, have to be tailored to the specific fluid being tested. The amount of aqueous iodine monochloride-hydrochloric acid solution needed will be that amount which is at least stoichiometric with the amount of lead as alkyllead present in the fluid. The quantity of buffering and masking solution needed will depend upon the presence of the beforementioned undesirable materials present in the fluid. The quantity of dithizone needed will be that amount necessary to be at least 75 percent in excess of stoichiometric with the leaddialkyl dihalide produced in the iodine monochloride step. The determination of actual numerical amounts for any fluid can be easily achieved by applying the teachings contained herein which state the purpose of each ingredient and by simple trial and error.

The following working example illustrates the process of this invention as utilized to determine lead as alkyllead concentration in gasoline.

EXAMPLE

An iodine monochloride solution (approximately 0.25M) was prepared by mixing 550 ml of potassium iodide solution (250 g potassium iodide diluted to 1 liter with ion-exchange water) with 500 ml of concentrated hydrochloric acid. While stirring, 84 g of reagent-grade potassium iodate was slowly added until all free iodine had redissolved to give a clear orange-red solution. The mixture was allowed to cool and diluted to 4 liters with ion-exchange water. Twenty ml portions were sealed in all-glass vials.

The buffering and masking solution was prepared by dissolving 80 g anhydrous sodium sulfite, 20 g dibasic ammonium citrate, 5 g disodium ethylenediaminetetraacetate in 550 ml of water. To this mixture was added 20 ml of a one-ml solution of tetraethylenepentamine diluted to 100 ml with water and 2 liters of concentrated ammonium hydroxide (0.9 Sp. Gr.). When the solution was well mixed 25 ml portions were sealed in all-glass vials.

Five ml portions of chloroform were sealed in all-glass vials.

The dithizone was prepared by dissolving 40 mg of diphenylthiocarbazone in 20 ml of chloroform. 0.20 ml Portions of this solution was pipetted into 4-dram screw-cap bottles. The chloroform was evaporated in a vacuum desiccator and the bottles were sealed and stored in the absence of light.

Twenty ml of iodine monochloride solution and 5.0 ml of gasoline were placed in a one-ounce squeezable plastic bottle. The bottle was sealed with a screw cap and after vigorously shaking for 2 minutes, was allowed to stand for several minutes. The screw cap was replaced with a wash bottle spout and a 10 ml aliquot of the aqueous solution was squeezed into the bottle. Then 25 ml of buffer solution was added, the bottle was stoppered and the solution was well mixed for 2–3 seconds until all black particles were dissolved.

Figure 2:
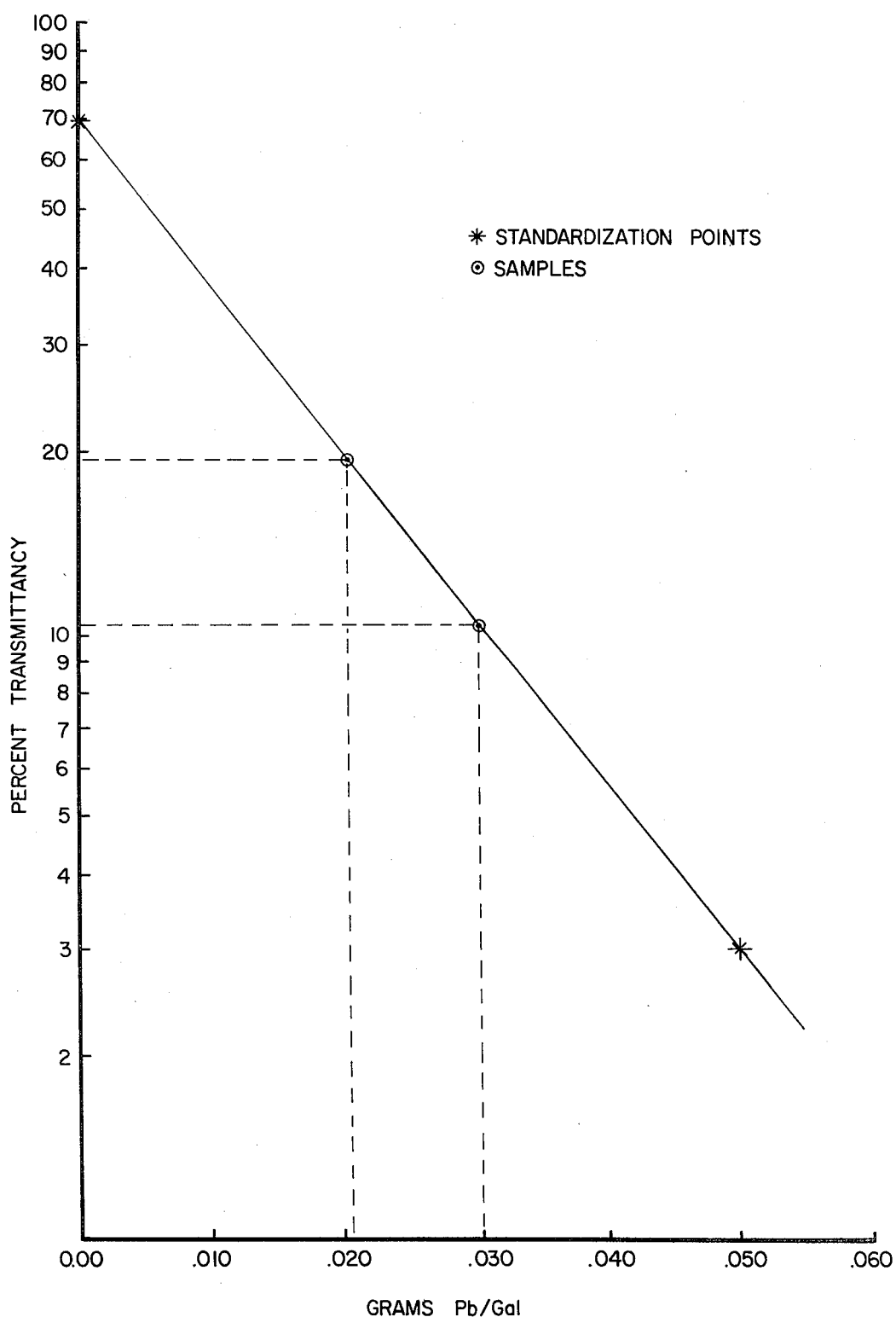

To obtain a standardization curve the procedure described below was used on a standardization sample which is methanol containing 0.050 grams lead/gallon methanol. A gasoline sample containing 0.050 gms. alkyllead/gallon can be used in place of the methanol if desired. A light transmittancy value was also obtained for 0.00 grams lead by following the procedure described below except that no alcohol or gasoline was used. These two runs give two points on a light transmittancy vs. grams lead/gallon gasoline graph. The resultant curve is a straight line and thus no other points are necessary. FIG. 2 illustrates the graph and resultant curve.

Two gasoline samples were then analyzed to determine their lead as alkyllead content. For the purpose of determining the accuracy of the process of this invention the lead content of the samples was known.

The following procedure was used for each sample including the standardization samples. Five ml of gasoline was added to a one-ounce squeezable plastic bottle having a screw-on cap. Also added to this bottle was a 20 ml portion of the above described aqueous iodine monochloride solution. The squeezable plastic bottle was then capped and the ingredients were shaken for 1 or 2 minutes. After shaking, the bottle was allowed to stand for about one minute so that the aqueous phase and the gasoline phase could separate. The cap was removed and a wash bottle spout was screwed to the bottle. The spout stem extended down to the bottom of the bottle. The bottle was then squeezed so that a 10.0 ml portion of the aqueous phase was delivered to a glass comparator cell. To the cell was added 25 ml of the above described buffering and masking solution. The cell was stoppered and the contents mixed well until all black particles were dissolved. Five ml of chloroform was then added to the bottle containing the dry dithizone. The bottle was stoppered and swirled to dissolve the dithizone in the chloroform. The dithizone-chloroform solution was then added to the comparator cell which was then stoppered and shaken vigorously for 30 seconds. The comparator cell was then allowed to remain at rest so that the aqueous phase and the solvent phase were allowed to separate. The solvent phase took on a yellow color and stratified to the bottom tubular portion of the comparator cell. The bottom portion of the comparator cell was then inserted into a Model T-600 Colorimeter. The colorimeter had been previously standardized so that chloroform gave a 100 percent transmittance using a 490 filter made by Instratech of California for use with the T-600. A reading of the colorimeter was then taken with the comparator cell in place in the apparatus. The colorimeter reading value is applied to the curve in FIG. 2 enabling a reading of the lead as alkyllead content in grams lead/gallon of gasoline. These values obtained for the two samples were 0.021 and 0.030 grams lead/gallon gasoline. These figures agree with the known lead concentration of the samples of 0.020 and 0.030 grams lead/gallon gasoline respectively.

Due to the versatility of the procedure of this invention, the graph illustrated in FIG. 2 may be utilized in the determination of gasoline samples containing lead in amounts greater than that shown on the X-axis. For example, if the gasoline is known to contain more than 0.05 g lead as alkyllead per gallon gasoline, e.g., 0.10 g, the practitioner need only double the amount of dithizone solvent used then multiply the results obtained on the graph by two. Thus it can be seen that by varying the amount of dithizone solvent used, accurate results can be obtained by multiplying the value obtained from the graph by the same factor as the factor utilized on the solvent.

As mentioned previously, after the alkyllead-containing fluid is contacted with the aqueous iodine monochloride-hydrochloric acid solution, it is desirable to withdraw a measured portion of the aqueous solution; especially in those cases where the fluid being analyzed is immiscible with the aqueous solution. When a measured amount is withdrawn the particular curve obtained will apply to those instances where that same amount of aqueous solution is withdrawn. The same curve however, may be used when the different amounts of aqueous solution are withdrawn as long as the results obtained on the curve are multiplied by a factor equal to the quotient of the volume used to obtain the curve divided by the volume presently being used.

As mentioned previously, the amount of dithizone added to the aqueous phase subsequent to treatment with the buffering and masking solution is an amount which is in excess of stoichiometric quantities. Since, in some cases, the amount of alkyllead originally in the fluid is not known with any degree of certainty, determination of the stoichiometric amount of dithizone for reaction with the formed lead dialkyllead dihalide must be achieved by trial and error. For example, the practitioner analyzing a fluid sample containing an unknown amount of lead may use dithizone in an amount which would be 100 percent in excess of stoichiometric for a concentration of 0.1 gram alkyllead/gallon fluid. The practitioner would then use dithizone in an amount which would be suitable for a concentration of 0.2 gram alkyllead/gallon fluid and note if any change in the color obtained between these two runs was found. If no change was found then the first amount of dithizone was a proper amount. If a darkening of the color when using the second amount of dithizone was noted, then the amount of dithizone should be increased until the same color is achieved between two increasing amounts of dithizone. When using this trial and error method it is better to utilize instrumentation to measure light transmittancy or color rather than the human eye. Of course, if a range is known in which alkyllead concentration should fall then the amount of dithizone to be used will be that amount which is at least 75 percent in excess of stoichiometric for the highest alkyllead concentration within that range.

As mentioned previously, the preferred alkylenepolyamines used in the buffering and masking solution is tetraethylenepentamine. However, other alkylenepolyamines such as ethylene diamine, diethylene triamine, triethylene tetraamine, propylene diamine (1,2-diaminopropane), 1,3-diaminopropane, iminobispropylamine, dimethylamino propylamine, diethylamino propylamine, and like water-soluble alkylenepolyamines are entirely suitable.

What is claimed is:

1. A process for the determination of the concentration of lead as alkyllead in gasoline which comprises:
   a. contacting the gasoline with an aqueous iodine monochloride-hydrochloric acid solution to convert the alkyllead to lead dialkyl dihalide in the aqueous solution, in which the halogen constituent is either chlorine, iodine or a mixture thereof;
   b. separating the aqueous solution from the contacted gasoline;
   c. treating the aqueous solution with a buffering and masking solution which contains,
      i. alkali metal sulfite,
      ii. dialkali metal ethylenediaminetetraacetate,
      iii. an alkylenepolyamine, alkali metal cyanide or a mixture thereof,
      iv. a base, and
      v. citrates, acetates or tartrates of ammonium or alkali metal or mixtures of such compounds;
   d. contacting the treated aqueous solution with a solution of inert colorless dithizone solvent, which is immiscible in water, and dithizone to convert the lead dialkyl dihalide to lead dialkyl dithizonate in the solvent phase; and
   e. determining, by comparing the color of the solvent phase with standardized colors or by measuring the color intensity of the solvent phase, the concentration of lead as alkyllead present in the gasoline.

2. The process of claim 1 wherein the gasoline contains less than 0.10 grams alkyllead/gallon of gasoline, and the molar concentration of iodine monochloride ranges from 0.75 to about 0.2 and the molar concentration of hydrochloric acid ranges from about 0.4 to about 0.7.

3. The process of claim 1 wherein the alkali metal sulfite is sodium sulfite or potassium sulfite.

4. The process of claim 1 wherein the base is a hydroxide of ammonium, alkali metal or a mixture thereof.

5. The process of claim 1 wherein the dialkali metal ethylenediaminetetraacetate is disodium ethylenediaminetetraacetate, dipotassium ethylenediaminetetraacetate or a mixture thereof.

6. The process of claim 1 wherein the citrate, acetate or tartrate of ammonium or alkali metal is dibasic ammonium citrate.

7. The process of claim 1 wherein the alkylenepolyamine is tetraethylenepentamine.

8. The process of claim 1 wherein the base is ammonium hydroxide; the alkali metal sulfite is sodium sulfite or potassium sulfite; the dialkyl metal ethylenediaminetetraacetate is disodium ethylenediaminetetraacetate or dipotassium ethylenediaminetetraacetate; the citrate, acetate or tartrate of ammonium or alkali metal is dibasic ammonium citrate; the alkylenepolyamine is tetraethylenepentamine; and the volumetric ratio of the gasoline to aqueous iodine monochloride-hydrochloric acid solution is from about 10:1 to about 1:20.

9. The process of claim 1 wherein the volumetric ratio of gasoline to aqueous iodine monochloride-hydrochloric acid solution is from about 10:1 to about 1:20.

10. The process of claim 1 wherein the alkali metal sulfite is present in an amount sufficient to reduce any excess iodine monochloride which may still be present in the aqueous phase to $I^-$ and $Cl^-$ ions; the citrates, acetates or tartrates of ammonium or alkali metal or mixtures of such compounds are present in an amount sufficient to complex metal ions which are present in the aqueous phase and which would precipitate as sulfites or hydroxides; the alkylenepolyamine, alkali metal cyanide or a mixture thereof is present in amounts sufficient to complex with metal ions which do not form precipitates but which form complexes with dithizone; the dialkyl metal ethylenediaminetetraacetate is present in an amount sufficient to complex with inorganic lead present in the aqueous solution; and the base is present in an amount sufficient to render the pH of the aqueous phase to which the buffering and masking solution is added to be within the range of from about 10 to about 11.5.

11. The process of claim 1 wherein the alkali metal sulfite is present in an amount ranging from about 0.25 to about 0.80 grams per milliliter of buffering and masking solution; the citrates, acetates or tartrates of ammonium or alkali metal or mixtures of such compounds are present in an amount ranging from about 0.0004 to about 0.4 grams per milliliter of buffering and masking solution; the alkylenepolyamine, alkali metal cyanide or a mixture thereof is present in an amount sufficient to complex soluble metal ions which complexes prevent the formation of a dithizone complex with the soluble metal ions; the dialkali metal ethylenediaminetetraacetate is present in an amount ranging from about 1 to about 10 milligrams per milliliter of buffering and masking solution and the base is present in an amount sufficient to give the aqueous phase to which buffering and masking solution is added a pH within the range of from about 10 to about 11.5.

12. The process of claim 11 wherein ingredient iii of the buffering and masking solution is tetraethylenepentamine present in an amount ranging from about 0.04 to about 0.4 milligrams per milliliter of buffering and masking solution.

13. The process of claim 11 wherein ingredient iii of the buffering and masking solution is alkali metal cyanide present in the amount of about 0.003 to about 0.012 grams per milliliter of buffering and masking solution.

* * * * *

UNITED STATES PATENT OFFICE
CERTIFICATE OF CORRECTION

PATENT NO. : 3,912,454
DATED : October 14, 1975
INVENTOR(S) : Louis J. Snyder

It is certified that error appears in the above-identified patent and that said Letters Patent are hereby corrected as shown below:

Col. 10, line 2, reads "dialkyl", should read -- dialkali --.

Signed and Sealed this thirteenth Day of April 1976

[SEAL]

Attest:

RUTH C. MASON
Attesting Officer

C. MARSHALL DANN
Commissioner of Patents and Trademarks